(12) United States Patent
Toon et al.

(10) Patent No.: US 10,140,373 B2
(45) Date of Patent: Nov. 27, 2018

(54) ELICITING USER SHARING OF CONTENT

(71) Applicant: Facebook, Inc., Menlo Park, CA (US)

(72) Inventors: Jonathon E. Toon, San Francisco, CA (US); David Shein, San Francisco, CA (US); Aaron Samuel Filner, San Francisco, CA (US); Devin Naquin, San Francisco, CA (US); Sundhar Ram Srinivasan, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 425 days.

(21) Appl. No.: 14/546,287

(22) Filed: Nov. 18, 2014

(65) Prior Publication Data

US 2015/0294222 A1 Oct. 15, 2015

Related U.S. Application Data

(60) Provisional application No. 61/979,966, filed on Apr. 15, 2014.

(51) Int. Cl.
*G06F 17/30* (2006.01)
*G06N 5/02* (2006.01)
*G06Q 50/00* (2012.01)

(52) U.S. Cl.
CPC ....... *G06F 17/30867* (2013.01); *G06N 5/022* (2013.01); *G06Q 50/01* (2013.01)

(58) Field of Classification Search
None
See application file for complete search history.

(56) References Cited

U.S. PATENT DOCUMENTS

| 9,892,103 | B2 * | 2/2018 | Manolescu | G06F 17/241 |
| 2012/0042262 | A1 | 2/2012 | Priyadarshan | |
| 2012/0226995 | A1 | 9/2012 | Kimchi | |
| 2013/0159919 | A1 * | 6/2013 | Leydon | G06F 3/0236 715/780 |
| 2013/0290439 | A1 * | 10/2013 | Blom | G06Q 50/01 709/206 |

(Continued)

FOREIGN PATENT DOCUMENTS

JP 2013-109698 6/2013

OTHER PUBLICATIONS

International Search Report and Written Opinion for International Application PCT/US2014/067990, dated Mar. 31, 2015.

*Primary Examiner* — Alan Chen
(74) *Attorney, Agent, or Firm* — Baker Botts L.L.P.

(57) ABSTRACT

In one embodiment, a method includes inferring an intent of the target user to post to a social-networking system based on one or more information items. One or more information items may be assembled that are relevant to one or more of the information items from which the intent to post was inferred. A prompt to post may be sent to the target user comprising one or more of the assembled information items. One or more indications of one or more reactions of the target user may be received from a client system of the target user. The one or more reactions of the target user may be used in both inferring a future intent to post on the part of future target users and assembling information items for future target users.

20 Claims, 10 Drawing Sheets

(56) References Cited

U.S. PATENT DOCUMENTS

| | | | |
|---|---|---|---|
| 2013/0311411 A1* | 11/2013 | Senanayake | G06F 3/013 706/13 |
| 2014/0025706 A1 | 1/2014 | Barve | |
| 2014/0082384 A1 | 3/2014 | De Cesare | |
| 2014/0088944 A1* | 3/2014 | Natarajan | G06Q 30/02 703/13 |
| 2015/0052087 A1* | 2/2015 | Srinivasan | G06N 5/02 706/12 |
| 2015/0058720 A1* | 2/2015 | Smadja | G06F 3/048 715/271 |

\* cited by examiner

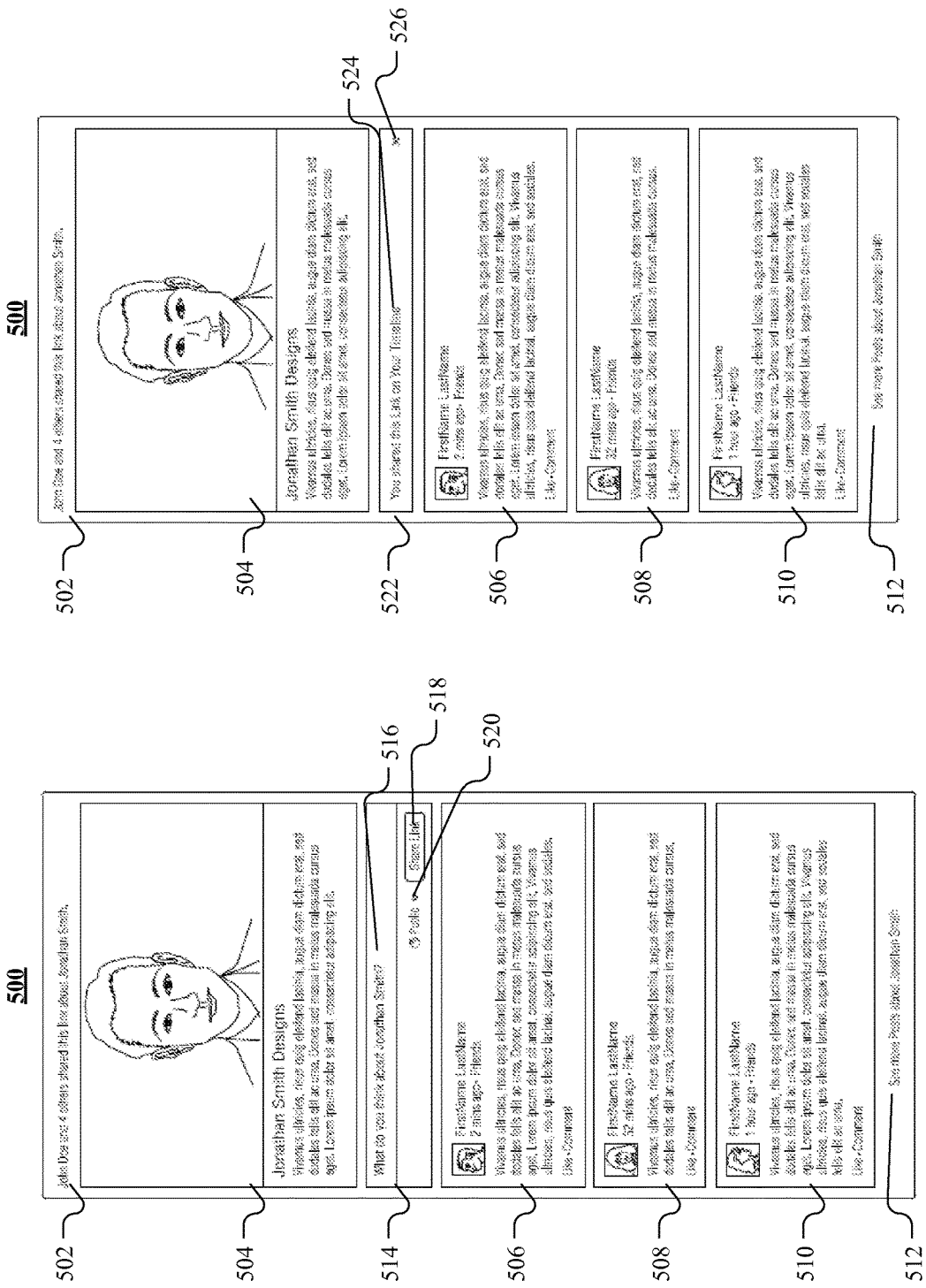

ELICITING USER SHARING OF CONTENT

PRIORITY

This application claims the benefit, under 35 U.S.C. § 119(e), of U.S. Provisional Patent Application No. 61/979,966, filed 15 Apr. 2014, which is incorporated herein by reference.

TECHNICAL FIELD

This disclosure generally relates to a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments a social-networking system inspires a target user to post to the social-networking system. The social-networking system may infer an intent of the target user to post to a social-networking system based on one or more information items. One or more information items may be assembled that are relevant to one or more of the information items from which the intent to post was inferred. A prompt to post may be sent to the target user comprising one or more of the assembled information items. One or more indications of one or more reactions of the target user may be received from a client system of the target user. The one or more reactions of the target user may be used in both inferring a future intent to post on the part of future target users and assembling information items for future target users.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 5a illustrates an example prompt that displays assembled information items and invites a target user to post to a social-networking system.

FIG. 5b illustrates the example prompt after the user has posted to the social-networking system.

DESCRIPTION OF EXAMPLE EMBODIMENTS

Figure 1:
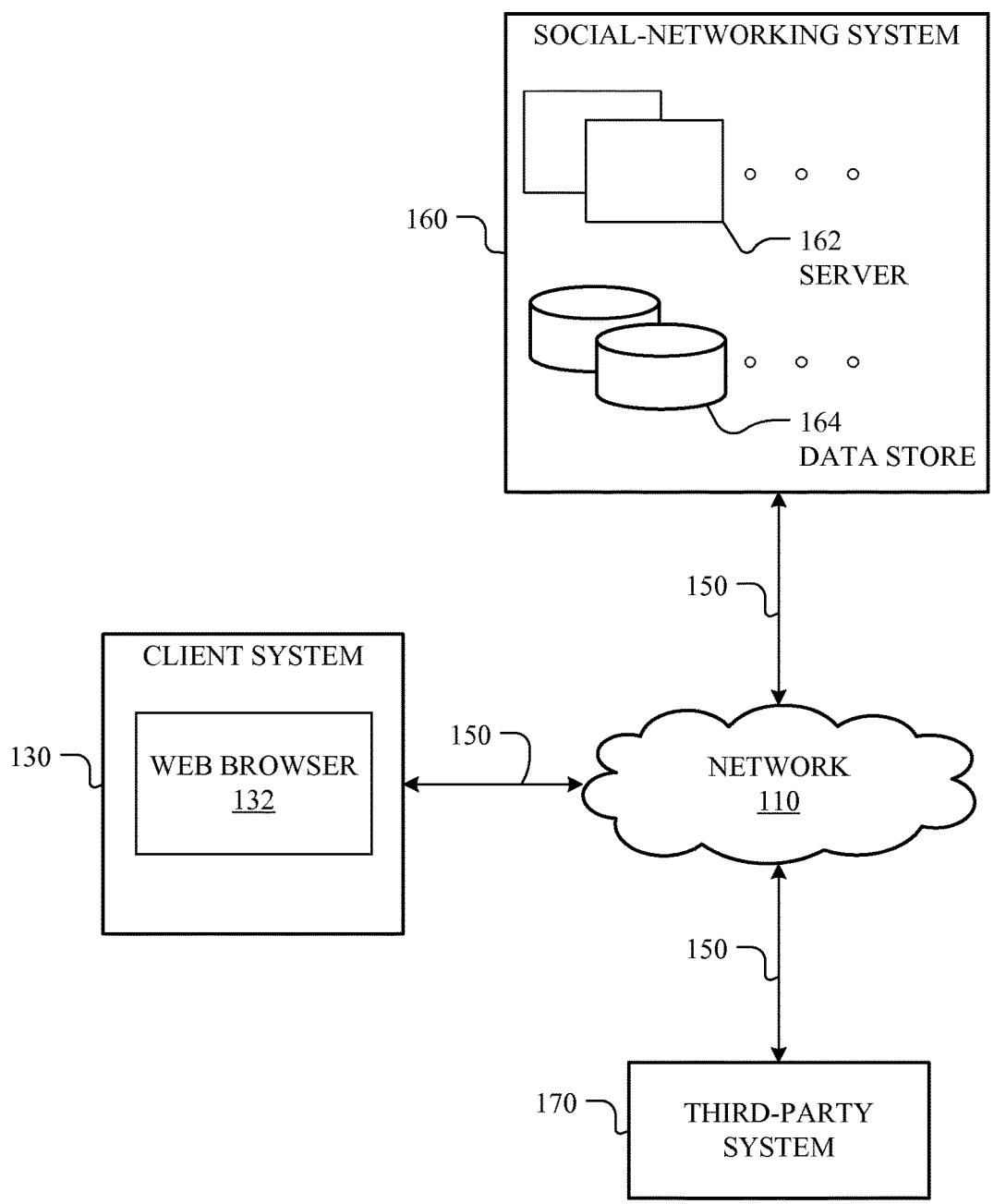
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to the server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
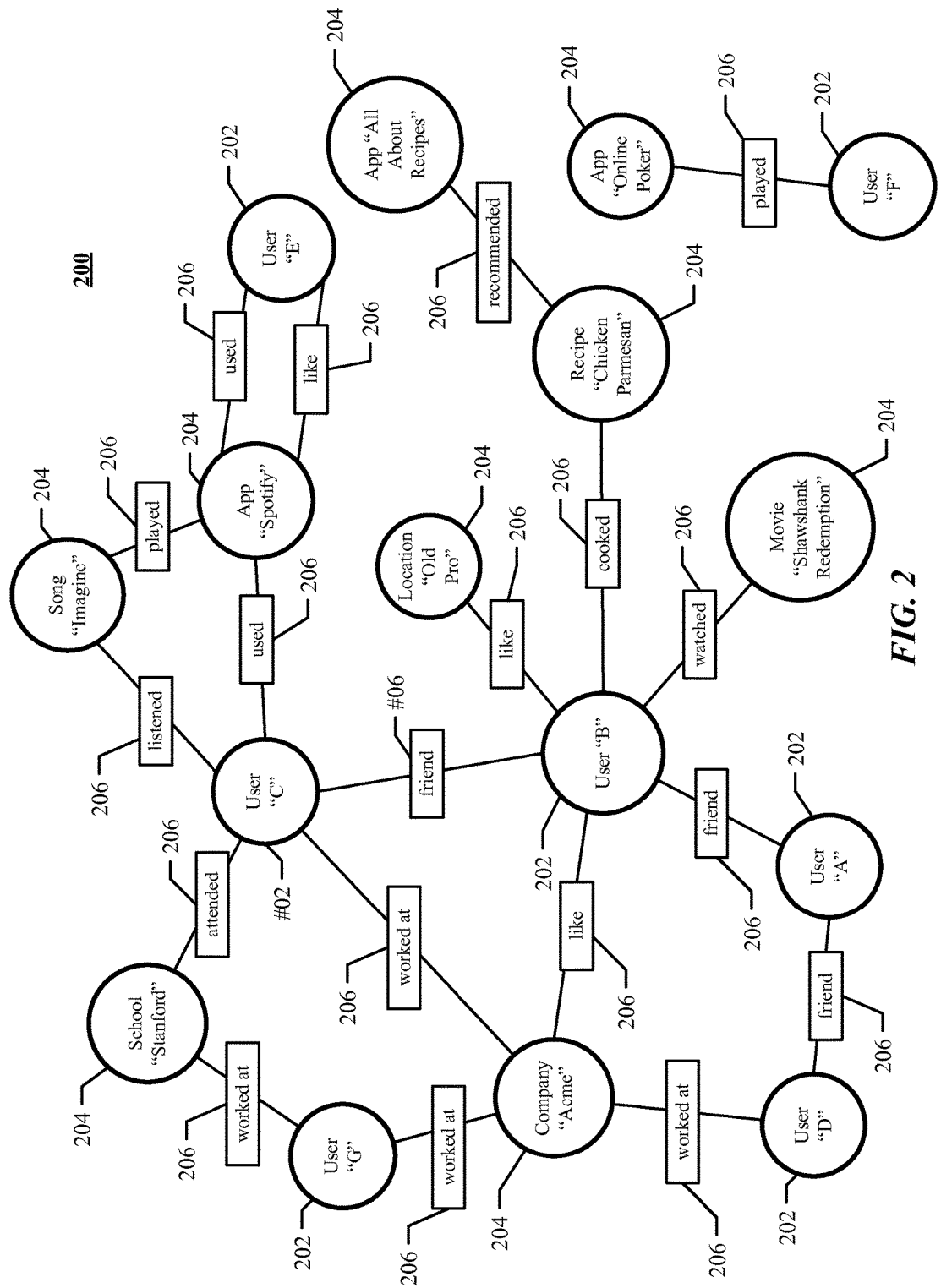
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503093, filed 11 Aug. 2006, U.S. patent application Ser. No. 12/977027, filed 22 Dec. 2010, U.S. patent application Ser. No. 12/978265, filed 23 Dec. 2010, and U.S. patent application Ser. No. 13/632869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identifying a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

As described herein, in particular embodiments, a social-networking system may inspire a target user to post to the social-networking system. The social-networking system may inspire the target user to post by inferring an intent to post on the part of the target user. In particular embodiments, the inferred intent may be the actual intent of the target user. For example, the social-networking system may infer that the target user wishes to post to the social-networking system and the target user may actually wish to post to the social-networking system. Alternatively, in particular embodiments, the inferred intent may not be the actual intent of the target user. For example, the social-networking system may infer that the target user wishes to post to the social-networking system but the target user may not actually wish to post to the social-networking system.

In particular embodiments, the inferred intent may be based upon one or more information items stored by or available to the social-networking system. An example of information items stored by the social-networking system may include social-graph information associated with the target user. Examples of information items available to the social-networking system may include information items that are accessible by the social-networking system and stored on one or more client systems, one or more third-party systems, one or more networks, or any combination thereof. In particular embodiments, an information item may be both stored on the social-networking system and available to the social-networking system. In particular embodiments, the inferred intent may be based upon some information items that are stored on the social-networking system and some other information items that are stored on one or more third-party systems. In particular embodiments, one or more of the other information items that are stored on one or more third-party systems may also be stored on the social-networking system. Alternatively, in particular embodiments, one or more of the other information items that are stored on one or more third-party systems may not also be stored on the social-networking system.

For example, in particular embodiments, the information items upon which the intent may be inferred includes but is not limited to social-graph information (e.g., nodes and edges, affinities, and degrees of separation), content objects, posts, textual data, location information, media, user profile information, temporal information, and privacy settings. In particular embodiments, one or more of the information items may fall into multiple categories. For example, one or more of the information items may be classified as social-graph information, a post, and media. Alternatively, in particular embodiments, one or more of the information items may fall into only one category.

In particular embodiments, the inferred intent may be based on one or more perspectives of one or more users of the social network. For example, the inferred intent may be based on a perspective of a hypothetical user that is based on one or more users of the social network. In particular embodiments, the hypothetical user may be based on every user of the social network. For example, and not by way of limitation, it may be inferred that a hypothetical user based on every user of the social network would have an intent to post on or about a specific date, including but not limited to New Year's Eve or New Year's Day. As another example, and not by way of limitation, it may be inferred that a hypothetical user based on every user of the social network would have an intent to post about a particular current event, including but not limited to the funeral of a head of state or a natural disaster of worldwide proportion.

As another example, in particular embodiments, the inferred intent may be based on a perspective of a hypothetical user that is based on a subset of users of the social network. In particular embodiments, the subset of users may be determined by any suitable means, including but not limited to one or more numerical limits, one or more temporal limits, one or more location-based limits, one or more degrees of separation, one or more affiliation coefficients between the target user and the users comprising the subset of users, one or more commonalities between the target user and the users comprising the subset of users, or any combination thereof. In particular embodiments, commonalities may include any feature or characteristic shared between the target user and the users comprising the subset of users, including but not limited to location, age, religion or religious beliefs, education, political affiliation or political beliefs, or common interests (e.g., interests in food, books, movies, or music). For example, and not by way of limitation, it may be inferred that a hypothetical user based on one-hundred users of the social-networking system who share a common interest with the target user, are within two degrees of separation of the target user, and have posted to the social-network about the common interest within the last hour would have an intent to post about the common interest. As another example, and not by way of limitation, it may be inferred that a hypothetical user based on twenty-five users who are within three years of age of the target user, are within one degree of separation of the target user, and are currently within 200 yards of a location of the target user would have an intent to post about the location or another nearby location.

As another example, in particular embodiments, the inferred intent may be based on a perspective of a hypothetical user based on the target user. For example, and not by way of limitation, it may be inferred that a hypothetical user based on the target user would have an intent to post on an anniversary of a life event of the target user (e.g., a beginning of a relationship or a birth or death of a relative). As another example, and not by way of limitation, it may be inferred that a hypothetical user based on the target user would have an intent to post if one or more new information items are detected on a client system of the target user (e.g., photographs recently taken by the target user's camera phone or a song recently identified by the target user's personal computer). As another example, and not by way of limitation, it may be inferred that a hypothetical user based on the target user would have an intent to post if a current location of the target user is significantly different from a previous location of the target user (e.g., the target user's current location is 1,200 miles away from a previous location that the target user was at three hours beforehand).

In particular embodiments, the social-networking system may assemble one or more information items relevant to one or more of the information items from which the intent to post was inferred. In particular embodiments, one or more of the assembled information items may be one of the information items from which the intent to post was inferred. For example, and not by way of limitation, if it was inferred that a hypothetical user based on the target user intended to post based on new information items detected on a client system of the target user, one or more of the new information items may be one or more of the assembled information items. In alternative embodiments, one or more of the assembled information items may not be one of the items information from which the intent to post was inferred, but may be pertinent or connected in any way to one or more of the information items from which the intent to post was inferred. For example, and not by way of limitation, if it was inferred that a hypothetical user based on all users of the social-networking system intended to post on New Year's Eve, one or more of the assembled of information may be a post of a user within one degree of separation of the target user that mentions or is otherwise related to New Year's Eve.

In particular embodiments, one or more of the assembled information items may be pertinent or connected to one or more of the information items from which the intent to post was inferred based on one or more of a temporal connection, a physical connection, a social-networking connection, or any combination thereof. For example, and not by way of limitation, if it was inferred that a hypothetical user based on the target user intended to post based on a current location of the target user that was significantly different from a previous location of the target user, one of the assembled information items may be an article about the current location (i.e., there is a physical connection between one of the information items from which the intent to post was inferred and one of the assembled information items). As another example, if it was inferred that a hypothetical user based on the target user intended to post on an anniversary of a life event, one of the assembled information items may be a video that was taken on or about the date of the life event (i.e., there is a temporal connection between one of the information items from which the intent to post was inferred and one of the assembled information items). As another example, if it was inferred that a hypothetical user based on twenty-five users who were within three years of age of the target user, were within one degree of separation of the target user, were are currently within 200 yards of a location of the target user intended to post about the location or another nearby location, one of the assembled information items may be a picture of one of the aforementioned twenty-five users (i.e., there is a social-networking connection between one of the information items from which the intent to post was inferred and one of the assembled information items).

In particular embodiments, one or more of the assembled information items may have existed before assembling information items began. For example, and not by way of limitation, one or more of the information items may be a photograph or video that was stored on a client system of the target user and retrieved by the social-networking system once the social-networking system began assembling information items. In alternative embodiments, one or more of the assembled information items may have existed only after assembling information items began. For example, one or more of the assembled information items may have been generated based upon one or more information items relevant to one or more of the information items from which the intent to post was inferred. For example, and not by way of limitation, if it was inferred that a hypothetical user based on one-hundred users of the social-networking system who shared a common interest with the target user, were within two degrees of separation of the target user, and had posted to the social-network about the common interest within the last hour would have an intent to post about the common interest, one or more of the assembled information items may be a question generated for the user to answer about the common interest (e.g., if the common interest is pizza, an assembled information item may have been generated that asks the user "when is the last time you ate pizza," "where was the last location you ate pizza," or "whom was the last person you ate pizza with?"). As another example, and not by way of limitation, if it was inferred that a hypothetical user based on the target user would have an intent to post on an anniversary of a life event of the target user, one or more of the assembled information items may be a textual description generated for the user to post about the life event (e.g., if the life event is a fifth-year wedding anniversary, an assembled information item may have been generated that says "share how happy you've been for the last five years").

In particular embodiments, one or more of the assembled information items may be information items that are displayable in a prompt to the target user. In particular embodiments, one or more of the assembled information items may be information items that are displayable in a prompt to the target user and are associated with information items that are not displayable in a prompt to the target user. For example, and not by way of limitation, if it was inferred that a hypothetical user based on all users of the social-networking system intended to post on Halloween, one or more of the information items on which the inference was based may have been a Halloween concept node of social-networking system's social graph, and one or more of the assembled information items may be a picture of a Halloween costume (e.g., the picture of the Halloween costume is associated with the Halloween concept node of the social-networking system's social graph).

In particular embodiments, one or more of the assembled information items may associated with one or more privacy settings. In particular embodiments, one or more of the privacy settings may be associated with the target user's social-networking profile or another user's social-networking profile. For example, a photograph that was posted to the social-networking system by the target user and is associated with a privacy setting of the target user's social-networking profile that allows the photograph to be re-posted by the target user with other users may be one of the assembled information items. As another example, and not by way of limitation, a status update that was posted to the social-networking system by another user and is associated with a privacy setting of the other user's social-networking profile that allows the status update to be re-posted by the target user may be one of the assembled information items. In particular embodiments, one or more of the privacy settings may be associated with one or more client systems or one or more third-party systems. For example, and not by way of limitation, a video that was stored on a phone of the target user and is associated with a privacy setting of the target user's phone that allows the photograph to be sent to the social-networking system may be one of the assembled information items. As another example, and not by way of limitation, an article that was stored on a server of a third party and is associated with a privacy setting of the third party's server that allows the article to be sent to the social-networking system may be one of the assembled information items.

In particular embodiments, the social-networking system may send the target user a prompt that displays one or more of the assembled information items and invites the target user to post to the social-networking system. In particular embodiments, the prompt may be displayable on a display of a client system of the target user (e.g., on a monitor of a personal computer of the target user or on a touchscreen of a phone of the target user). In particular embodiments, the prompt may be displayable on the entirety of a display or on only a portion of a display. In particular embodiments, the prompt may be displayable on a display over or as part of a standard or application-specific user interface of a client system of the target user. For example, and not by way of limitation, the prompt may be displayable on a display as part of or as a pop-up over a user interface displayed on a monitor of a personal computer of the target user by a third-party application running on the personal computer. As another example, the prompt may be displayable on a display as part of or as a pop-up over a lock screen displayed on a touch screen of a phone of the target user.

In particular embodiments, the prompt may be displayable as part of a user interface for the social-networking system. For example, and not by way of limitation, the prompt may be laid over all or a part of a user interface for the social-networking system. In particular embodiments, the user interface may dim or fade when the prompt is laid over all or a part of the user interface. In particular embodiments, the prompt may be incorporated into part of the user interface. For example, and not by way of limitation, the prompt may be incorporated into a newsfeed that is displayed to the target user as part of the user interface for the social-networking system. In particular embodiments, the prompt may be incorporated into any part of a newsfeed (e.g., the prompt may be incorporated at the top of the news feed or be embedded at any location inside the newsfeed).

In particular embodiments, the prompt may include a composer window operable to allow the target user to alter the composition of the assembled information items displayed in the prompt. For example, and not by way of limitation, the composer window may be operable to allow the target user to add one or more new information items that were not included among the assembled information items displayed in the prompt (e.g., the target user may add text to the prompt or add a tag of a user of the social network to a photograph displayed in the prompt). As another example, and not by way of limitation, the composer window may be operable to allow the target user to remove one or more assembled information displayed in the prompt (e.g., the target user may remove a video from the prompt).

In particular embodiments, the composer window may be operable to allow the target user to edit or otherwise alter one or more of the assembled information items displayed in the prompt. For example, and not by way of limitation, the composer window may allow the target user to edit or otherwise alter a photograph (e.g., crop, add a filter to or delete a filter from, or add layers to or delete layers from the photograph). As another example, and not by way of limitation, the composer window may allow the target user to edit or otherwise alter text (e.g., if one of the assembled information items displayed in the prompt was a question asking the user "where was the last location you ate pizza," the user may replace the question with the answer "Pizza Shack").

In particular embodiments, the prompt may include one or more controls operable to allow the target user to choose whether and/or how to post the prompt to the social-networking system. For example, and not by way of limitation, one or more of the controls may be operable to allow the target user to choose where within the social-networking system to post the material (e.g., in a news feed of the target user or other users or on a profile page of the target user or other users). As another example, and not by way of limitation, one or more of the controls may be operable to allow the target user to assign, remove, or change one or more privacy settings associated with the prompt or one or more of the information items assembled and displayed to the user in the prompt or added by the user to the prompt. In particular embodiments, a default privacy setting may exist for the prompt. For example, the default privacy setting for the prompt may be the most restrictive privacy setting associated with any of the information items from which the intent to post was inferred or any of the assembled information items. The controls may be operable to allow the target user to change from the default privacy setting to a different privacy setting.

In particular embodiments, the prompt may include any number of display windows that may each include any of the features discussed herein. In particular embodiments, the prompt may show one or more of the display windows at the same time or at different times. In particular embodiments, the prompt may show the display windows at the same location or at different locations on a display.

In particular embodiments, the prompt may be generated based at least in part on one or more templates stored on or accessible by the social-networking system. In particular embodiments, each template may be associated with a particular type of prompt. For example, and without limitation, if intent to post was inferred based at least in part upon an information associated with a life event, there may be a specific template used for generating prompts associated with life events.

In particular embodiments, the social-networking system may receive from a client system of the target user one or more indications of one or more reactions of the target user to the prompt. The indications may include, for example, whether the target user interacted with the prompt, how long it took the target user to interact with the prompt, whether the target user added any information items, whether the target user removed or edited any of the assembled information items, whether the target user chose to post the prompt to the social-networking system, how the target user chose to post the prompt to the social-networking system, and whether the target user assigned, removed, or changed any privacy settings. In particular embodiments, the social-networking system may post or not post the prompt, taking into account one or more of the reactions of the target user. For example, and not by way of limitation, if the user's reaction included adding an information item, assigning a privacy setting to the post, and choosing to allow the social-networking system to post the prompt to the target user's profile page, the social-networking system may post the prompt to the target user's profile page, add the assigned privacy setting to the post, but not include the added information item.

In particular embodiments, the reaction of the target user may be used by the social-networking system in inferring a future intent to post on the part of one or more future target users. In particular embodiments, inferring the future intent may take into account any information items used at any point to inspire the target user to post (e.g., the information items used to infer an intent of the target user, the assembled information items, the prompt, the target user's reactions to the prompt, or any combination thereof). Future target users may be, for example, the same target user whose reactions are being used to infer the future intent to post or other target users of the social-networking system.

For example, and not by way of limitation, if it was inferred that a hypothetical user based on the target user would have an intent to post on an anniversary of a life event of the target user, but the target user declined to post in response to viewing an associated prompt, that reaction may be used to infer in determining a future intent of that target user that the target user would be less likely to intend to post on a future anniversary of a life event. In particular embodiments, using these information items to infer a future intent to post on the part of future target users may be done at varying levels of granularity. For example, if the life event discussed above was an anniversary of a death of a relative, that reaction of the target user may be used to infer in determining a future intent of that target user that the target user would be less likely to intend to post on a future anniversary of the death of a relative, but that reaction may be neutral in inferring whether the target user intends to post on a future anniversary of the beginning of a relationship.

As another example, and not by way of limitation, if it was inferred that a hypothetical user based on one-hundred users of the social-networking system who share a common interest with the target user, are within two degrees of separation of the target user, and have posted to the social-network about the common interest within the last hour would have an intent to post about the common interest, but the target user declined to post in response to viewing an associated prompt, that reaction may be used to infer in determining a future intent of a different future target user who shares the common interest with the target user would be less likely to intend to post about the common interest.

In particular embodiments, one or more reactions of the target user may be used by the social-networking system in assembling information items for future target users. In particular embodiments, inferring the future intent may take into account any information items used at any point to inspire the target user to post (e.g., the information items used to infer an intent of the target user, the assembled information items, the prompt, the target user's reactions to the prompt, or any combination thereof). Future target users may be, for example, the same target user whose reactions are being used to infer the future intent to post or other target users of the social-networking system.

For example, and not by way of limitation, if an information item that was stored on one or more client systems of the target user was an assembled information item, and the user removed the information item, that reaction may be used to make it less likely that information items stored on the client system of the target user will be assembled information items in the future for that target user. In particular embodiments, using these information items to assemble information items for future target users may be done at varying levels of granularity. For example, if the information item discussed above was a photograph, that reaction may be used to make it less likely that photographs stored on the client system of the target user will be assembled information items in the future for that target user, but that reaction may be neutral in assembling videos stored on the client system of the target user in the future for that target user.

Figure 3:
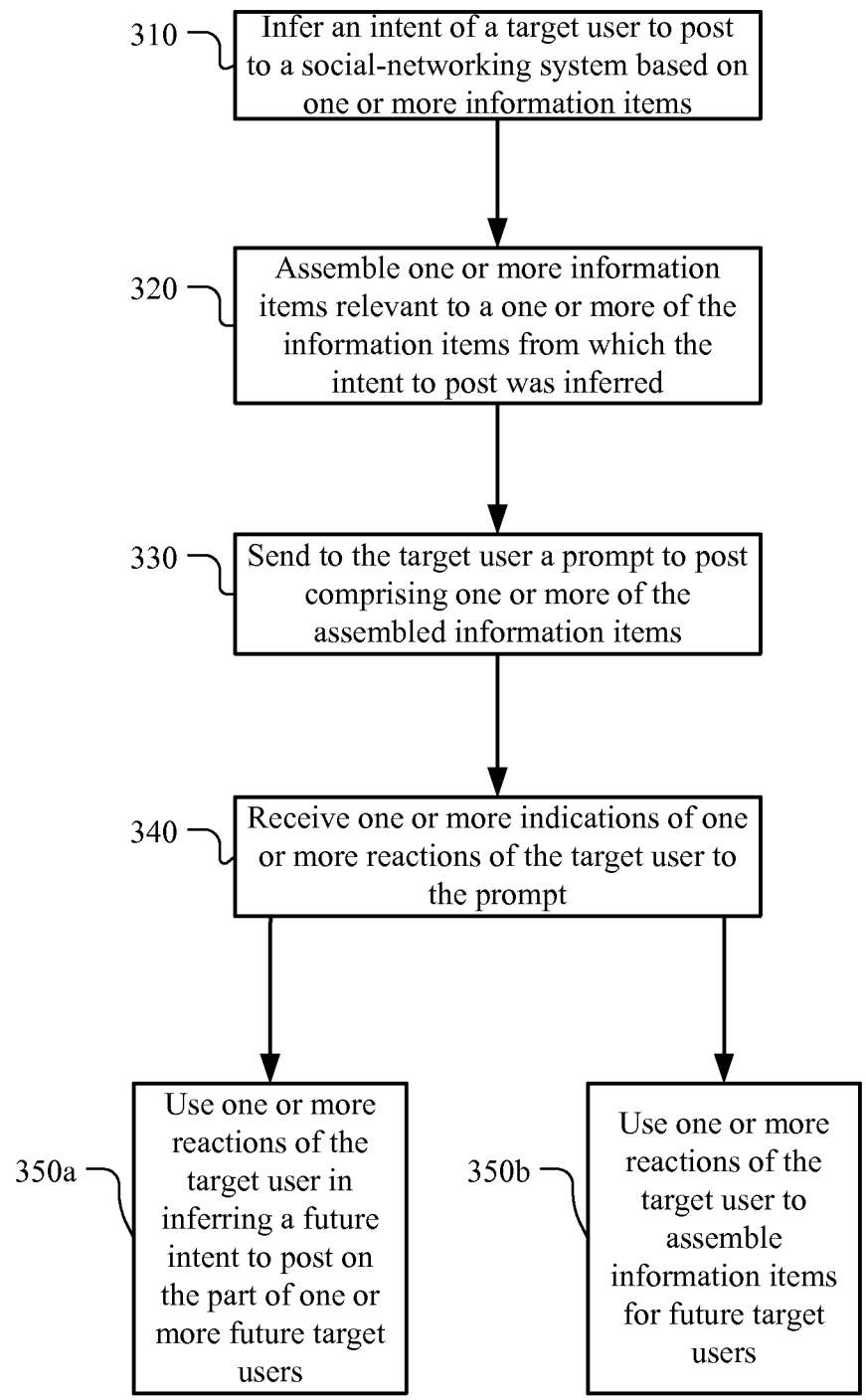
FIG. 3 illustrates an example method for inspiring a user to post to a social-networking system.

FIG. 3 illustrates an example method 300 for inspiring a user to post to a social-networking system. The method may begin at step 310, where an intent of a target user to post to a social-networking system is inferred based on one or more information items. At step 320, one or more information items may be assembled that are relevant to one or more of the information items from which the intent to post was inferred. At step 330, a prompt to post comprising one or more of the assembled information items may be sent to the target user. At step 340, one or more indications of one or more reactions of the target user may be received from a client system of the target user. At step 350a, the one or more reactions of the target user may be used in inferring a future intent to post on the part of one or more future target users. At step 350b, one or more reactions of the target user may be used in assembling information items for future target users. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for inspiring a user to post to a social-networking system including the particular steps of the method of FIG. 3, this disclosure contemplates any suitable method for inspiring a user to post to a social-networking system including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4A:
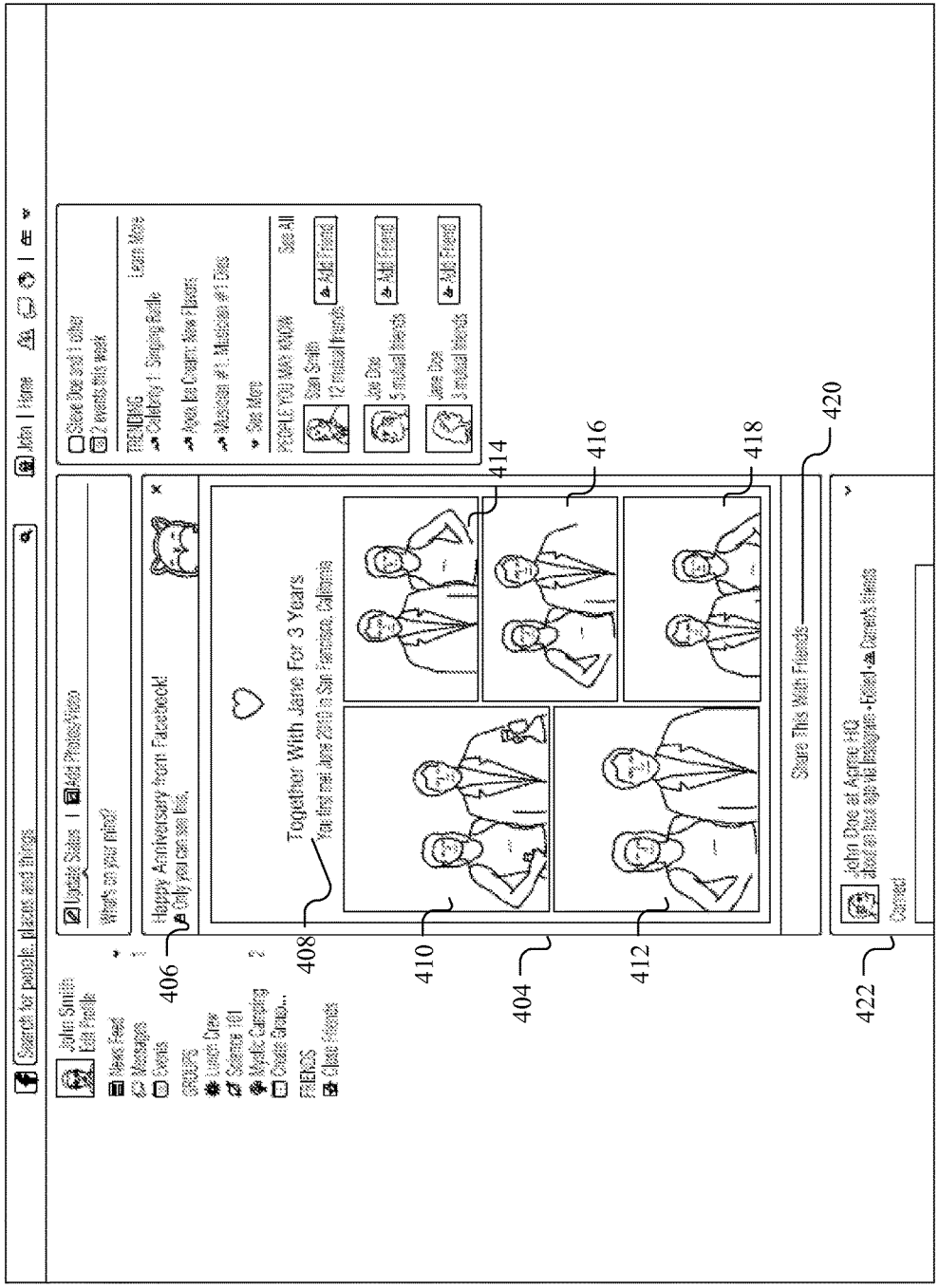
FIG. 4a illustrates an example prompt that displays assembled information items and invites a target user to post to a social-networking system.

FIG. 4a illustrates an example prompt 404 that that displays assembled information items and invites the target user to post to the social-networking system. In this embodiment, it was inferred that a hypothetical user based on the target user would have an intent to post on an anniversary of a life event of the target user (in this case, a romantic relationship that began three years prior). Prompt 404 is displayed at the top of a news feed displayed on an example social-networking user interface 400. Included in the news feed, in addition to prompt 404, is news feed item 422 (which, in this example embodiment, is unrelated to example prompt 404). Prompt 404 includes assembled information items 406, 408, 410, 412, 414, 416, and 418. Assembled information item 406 is a textual notification that notifies the target user about the purpose of the prompt and also notifies the target user who can see the prompt (in this case, only the target user). Assembled information item 408 is text that was both generated and retrieved by the social networking system. "Jane," "June 2010," and "San Francisco, Calif." are textual information items that were provided by the target user to the social-networking system and stored on the social-networking system. The rest of the textual information items were generated by the social-networking system from a template that is specific to the type of prompt (in this case, a life event). Assembled information items 410, 412, 414, 416, and 418 are pictorial information items. Assembled information items 410, 412, and 414 were retrieved from the social-networking system. Assembled information item 416 was retrieved from a client system of the target user. Assembled information item 418 was retrieved from a third-party system. Control 420 is a control operable to allow the target user to choose whether to post the prompt to the social-networking system.

Figure 4B:
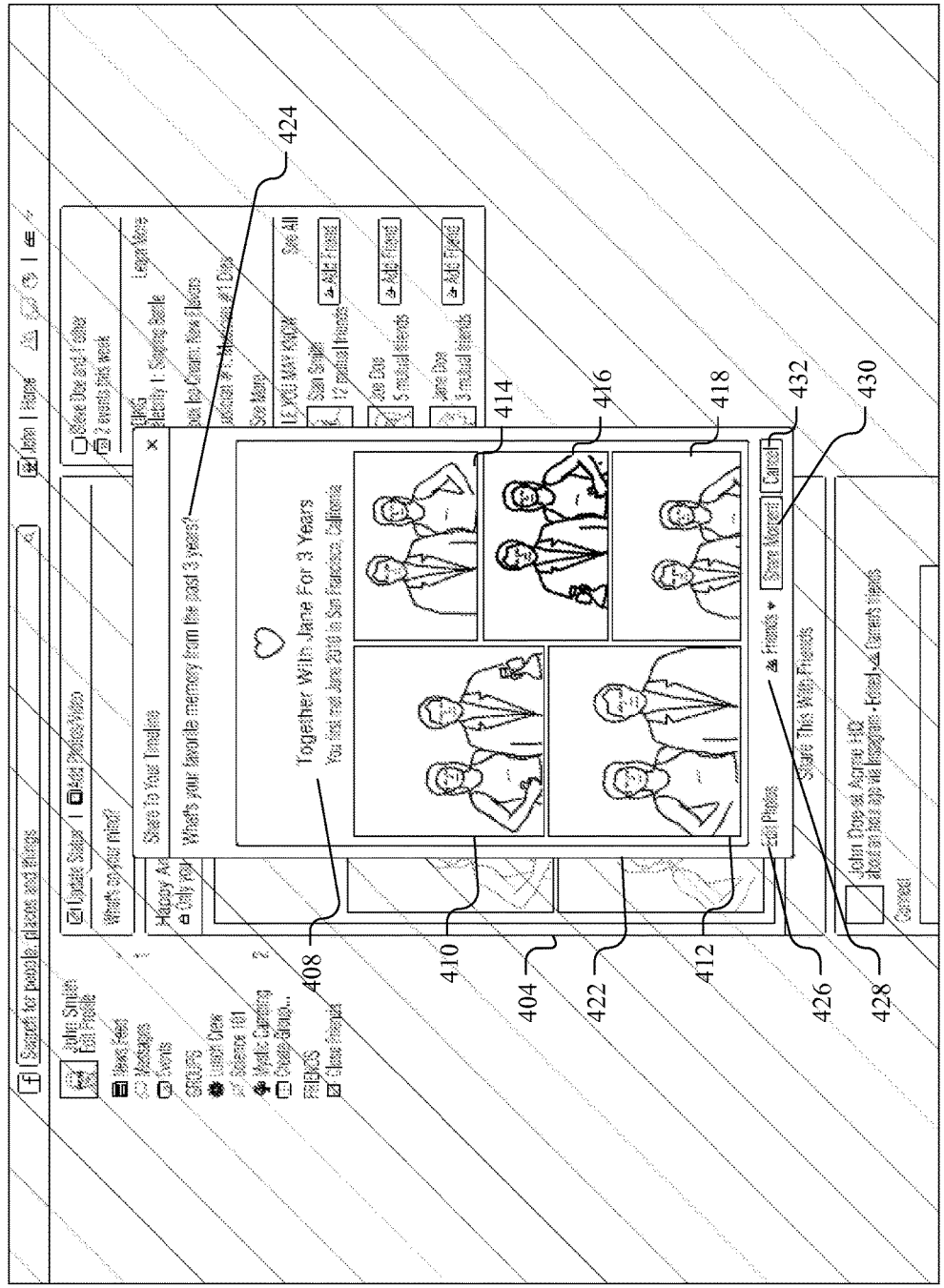
FIG. 4b illustrates an example composer window associated with the example prompt that enables the target user to edit and delete assembled information items and add new information items.

FIG. 4b illustrates an example composer window 422 associated with prompt 404. After clicking on control 420 illustrated on FIG. 4a, the target user sees the composer window 422, which is a window laid over part of social-networking user interface 400. Part of prompt 404 can be seen as part of the visible portion of social-networking user interface 400, which appears faded to the user. Composer window 422 includes assembled information items 408, 410, 412, 414, 416, and 418, which were included in prompt 404. Composer window 422 also includes assembled information item 424, which is text that was generated by the social networking system (and in this case is a specific question asked to the target user). Composer window 422 also includes controls 426, 428, 430, and 432. Control 426 is a control operable to allow the target user to add new information items or remove any or all of pictorial assembled information items 410, 412, 414, 416, and 418. Control 428 is a control operable to allow the target user to assign, remove, or change a privacy setting associated with a post sent to the social-networking system based on prompt 404. Control 430 is operable to allow the user to post prompt 404 to the social-networking system. Control 432 is operable to allow the user to close composer window 422.

Figure 4C:
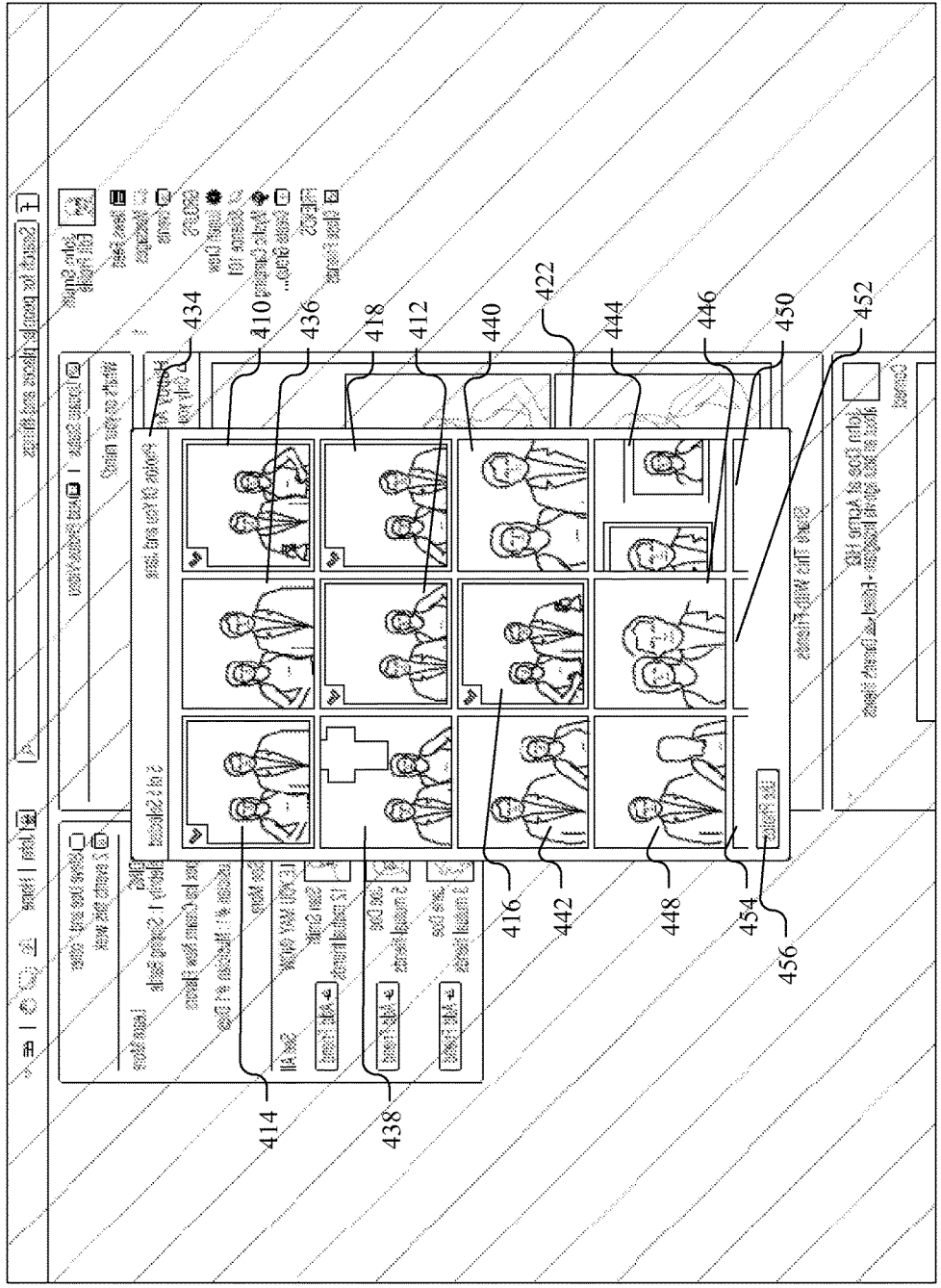
FIG. 4c illustrates an example composer window associated with the example prompt that enables the target user to delete pictorial assembled information items and add new pictorial assembled information items.

FIG. 4c illustrates composer window 422 after the user has clicked on control 426. Composer window 422 now includes assembled information item 434, which is a textual description of assembled information items 410, 412, 414, 416, and 418, in addition to assembled information items 436, 438, 440, 442, 444, 446, 448, and 450. Information items 452 and 454 are pictures that were not assembled, but were taken by the target user thereafter and are stored on a client device of the target user. By interacting with composer window 422 (specifically, in this example embodiment, by clicking on each information item), the user is able to select which information items to include in a post to the social-networking system. As indicated by checkmarks and a border around the respective information item, assembled information items 410, 412, 414, 416, and 418 are automatically selected for the target user. The target user may, however, unselect these information items or select assembled information items 436, 438, 440, 442, 444, 446, 448, and 450, or select information items 452 or 454. Control 456 is operable to allow the user to include only the selected information items in a post to the social-networking system.

Figure 4D:
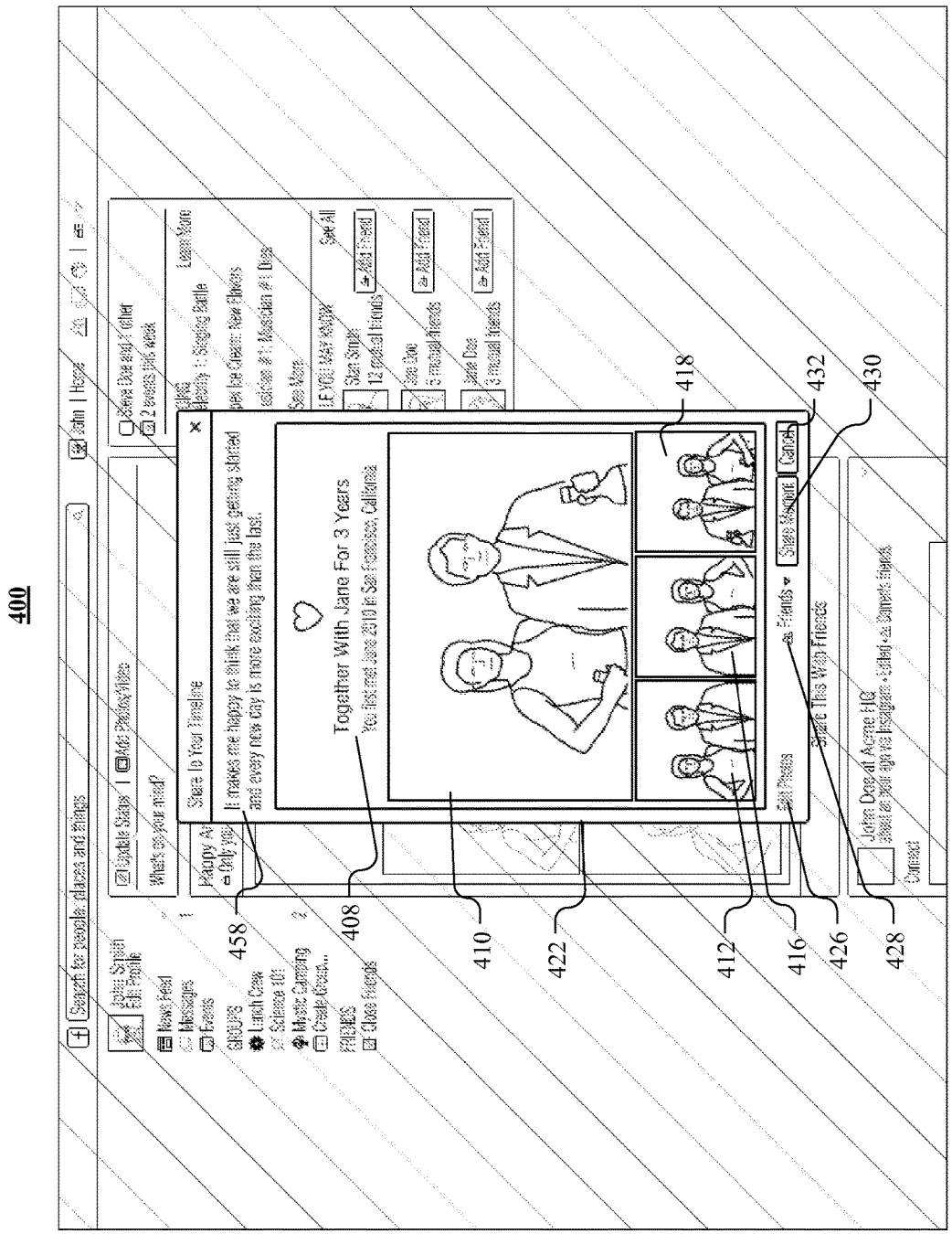
FIG. 4d illustrates an example composer window associated with the example prompt that displays assembled information items and additional information items selected by the target user.

FIG. 4d illustrates composer window 422 after the user has clicked on control 456. Composer window 422 again displays assembled information item 408. Because the target user unselected assembled information item 418, composer window 422 now includes only assembled information items 410, 412, 414, and 416. Further, because one of the information items has been unselected, the locations and dimensions of assembled information items 410, 412, 414, and 416 have been changed. In this embodiment, the locations and dimensions of assembled information items 410, 412, 414, and 416 were changed automatically by the social-networking system, but in other embodiments the locations and dimensions of information items could be changed by the user. Assembled information item 424, which was shown in FIG. 4b, has been replaced by information item 458. Information item 458 it text input by the user, which is an answer to the question asked via assembled information item 424. The target user has input the text of information item 458 after clicking on assembled information item 424, but text could be input through a variety of other methods in other embodiments. Controls 426, 428, 430, and 432 are displayed, which were also displayed in FIG. 4b and have the same functionality. For example, if the target user clicked on control 426, the user would again see a composer window similar to that displayed in FIG. 4c. Because the user has "friends" listed by control 428, the social-networking system will apply a privacy setting that will allow only friends of the target user to view a post that contains information items 408, 410, 412, 414, and 416. In other embodiments, the user may select any number of privacy settings by operating control 428.

Figure 4E:
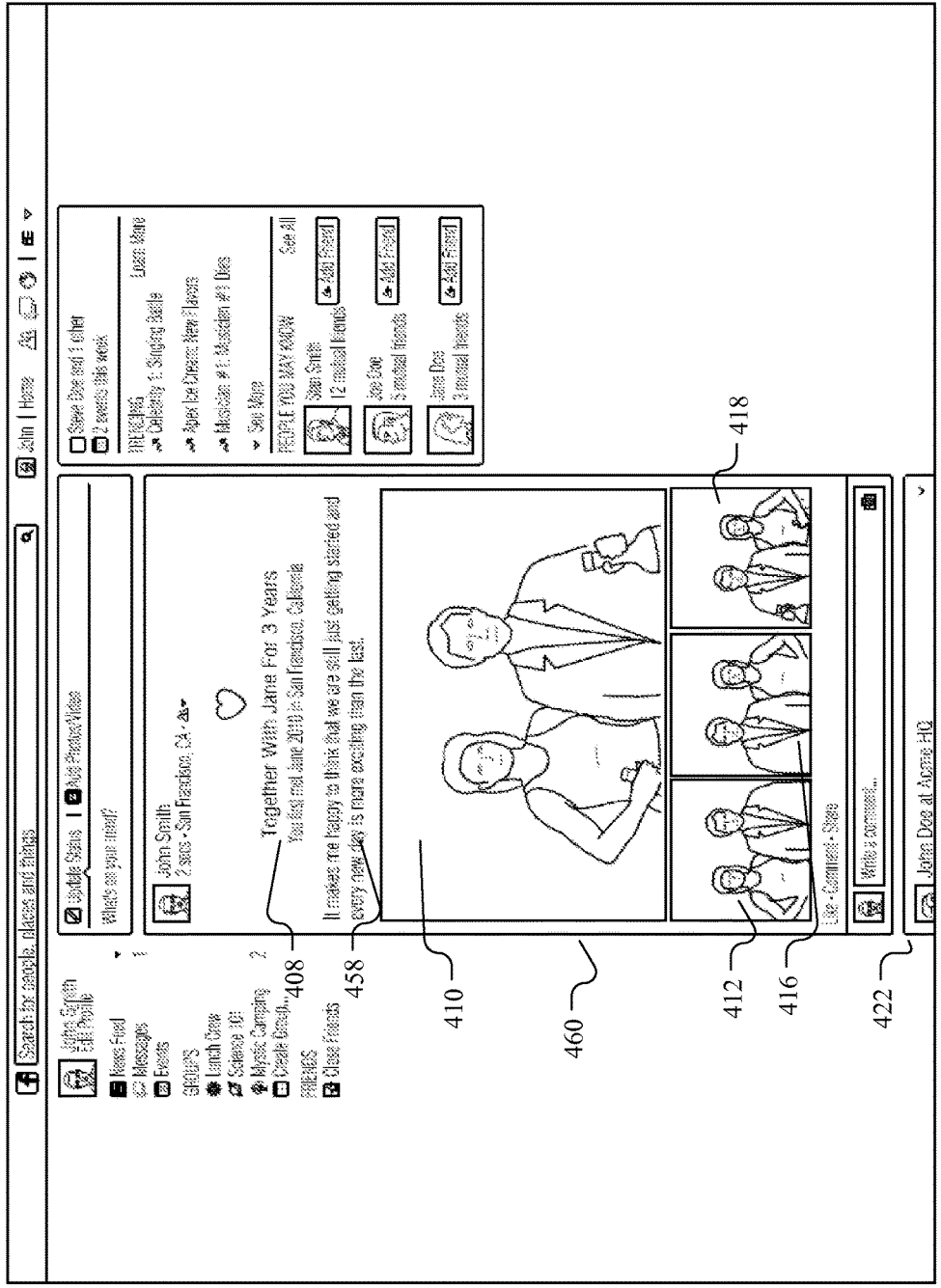
FIG. 4e illustrates an example post associated with the example prompt and the example composer windows.

FIG. 4e illustrates an example post 460, which the user has posted to the social-networking system. In this embodiment, post 460 has been posted to a timeline of the target user, and as a result appears on the target user's news feed. In this embodiment, post 460 appears in the same location as prompt 404 previously appeared, although in other embodiments post 460 could appear in different locations in the target user's news feed. Post 460 includes information item 458 and assembled information items 408, 410, 412, 414, and 416.

FIG. 5a illustrates an example prompt 500 that that displays assembled information items and invites the target user to post to the social-networking system. In this embodiment, it was inferred that a hypothetical user would have an intent to post to the social-networking system based on five users of the social-networking system who are within one degree of separation of the target user and have posted an information item (in this embodiment, a link) to the social-networking system, a pictorial and textual description of which is provided to the user as assembled information item 504, which is included in prompt 500. Prompt 500 also includes assembled information item 502, which textually notifies the user about the purpose of the prompt, and assembled information items 506, 508, and 510, which are posts made by other users to the social-networking system that included the link. Also included in prompt 500 is control 512, which is operable to allow the user to view more assembled information items in prompt 500. Prompt 500 also includes composer window 514, which in this embodiment allows the target user to enter text. Included in composer window 514 is assembled information item 516, which is a question generated for the user about the link. In this embodiment, the user may click on or about assembled information item 516 to replace it with an information item (in this case, input text that answers the question). Prompt 500 also includes control 520 which is operable to allow the target user to assign, remove, or change a privacy setting associated with a post sent to the social-networking system based on prompt 500. In this embodiment, a "public" privacy setting is selected, which would share the target user's post with all users of the social-networking system. Prompt 500 also includes control 518, which is operable to share some information items displayed to the user in prompt 500—in this case assembled information item 504 and any text input by the user as an information item.

FIG. 5b illustrates example prompt 500 as it appears after the target user has posted to the social-networking system using control 518. Prompt 500 still displays assembled information items 502, 504, 506, 508, and 510 to the user, in addition to control 512, but composer window 514 is no longer displayed. In this embodiment, it has been replaced with a notification window 522 that includes information item 524, which notifies the target user that the post has been shared on a timeline of the target user. Further, notification window 522 includes control 526, which is operable to cease display of information item 524.

Figure 6:
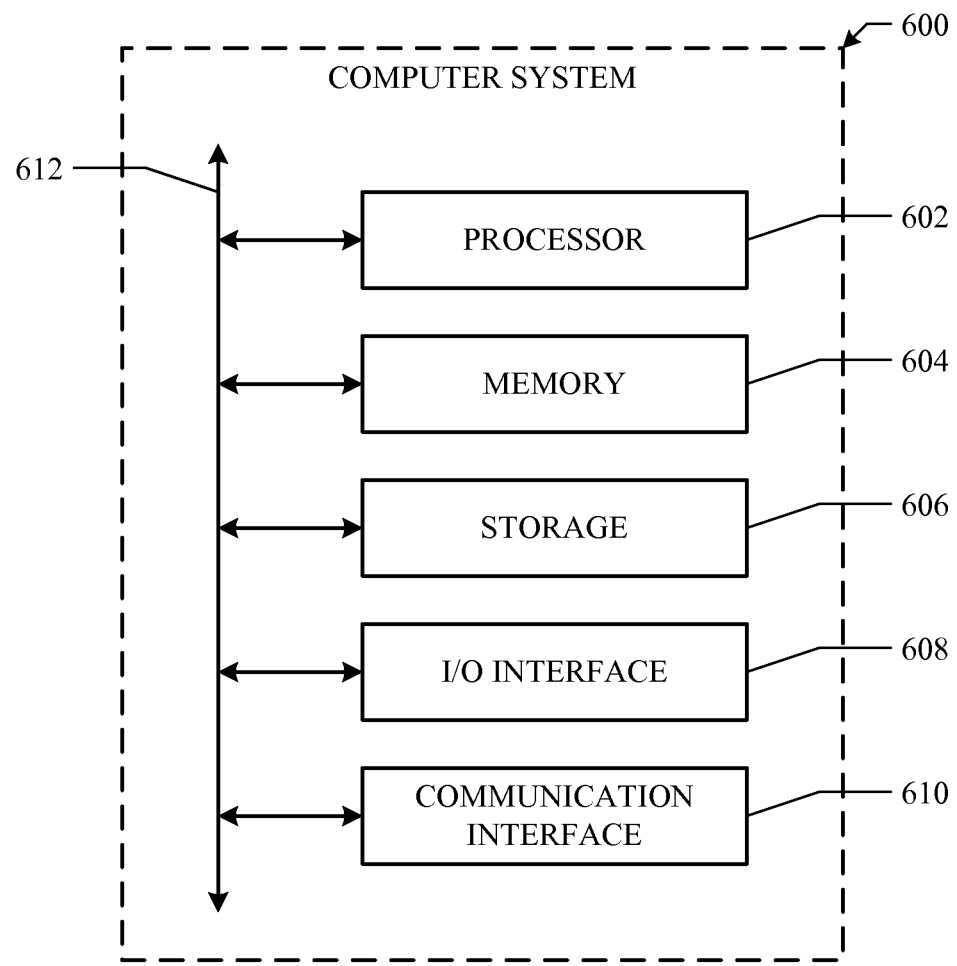
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by one or more computing devices, accessing a social-networking system to retrieve one or more first media items associated with a target user, the one or more first media items also associated with an entity of a social graph having a coefficient measurement determined based on a relationship between the entity and the target user that is greater than a threshold coefficient measurement;

by one or more computing devices, inferring an intent of the target user to post to the social-networking system based on one or more of the retrieved first media items and at least one of social graph information, location information, user profile information, temporal information, and privacy information associated with the target user;

by one or more computing devices, assembling one or more second media items relevant to the entity of the social graph having the coefficient measurement greater than the threshold coefficient measurement and at least one of social graph information, location information, user profile information, temporal information, and privacy information associated with the target user from which the intent to post was inferred;

by one or more computing devices, sending to the target user a first prompt to post comprising one or more of the assembled second media items;

by one or more computing devices, receiving one or more indications of one or more reactions of the target user to one or more of the assembled second media items in the first prompt; and by one or more computing devices, sending to the target user a second prompt to post one or more third media items selected based on the one or more reactions of the target user to the first prompt, wherein the first media items, the second media items, and the third media items are multimedia items.

2. The method of claim 1, wherein inferring the intent of the target user is based at least in part on a perspective of a hypothetical user that is based at least in part on one or more users of the social network.

3. The method of claim 2, wherein the hypothetical user is based at least in part on:
each of the users of the social network;
one or more subsets of the users of the social network; or
the target user.

4. The method of claim 1, further comprising by one or more computing devices, generating the first prompt based at least in part on one or more templates, wherein each of the templates is associated with a prompt type.

5. The method of claim 1, further comprising:
by one or more computing devices, inferring a future intent of the target user to post to the social networking system based on the one or more third media items.

6. The method of claim 1, further comprising:
by one or more computing devices, assembling one or more fourth media items relevant to the one or more third media items from which a future intent of the target user to post was inferred, wherein the assembling is based at least in part on one or more of the received indications.

7. The method of claim 5, wherein one or more of the reactions comprises:
one or more interactions by the target user with the first prompt;
no interactions by the target user with the first prompt;
a period of time with which the target user interacted with the first prompt;
one or more additions to, removals from, or edits to one or more of the assembled second media items; or
one or more assignments to, removals from, or changes to one or more privacy settings associated with one or more of the assembled second media items.

8. One or more computer-readable non-transitory storage media embodying software that is operable when executed to:
access a social-networking system to retrieve one or more first media items associated with a target user, the one or more first media items also associated with an entity of a social graph having a coefficient measurement determined based on a relationship between the entity and the target user that is greater than a threshold coefficient measurement;
infer an intent of the target user to post to the social-networking system based on one or more of the retrieved first media items and at least one of social graph information, location information, user profile information, temporal information, and privacy information associated with the target user;
assemble one or more second media items relevant to the entity of the social graph having the coefficient measurement greater than the threshold coefficient measurement and at least one of the social graph information, the location information, the user profile information, the temporal information, and the privacy information from which the intent to post was inferred;
send to the target user a first prompt to post comprising one or more of the assembled second media items;
receive one or more indications of one or more reactions of the target user to one or more of the assembled second media items in the first prompt; and
send to the target user a second prompt to post one or more third media items selected based on the one or more reactions of the target user to the first prompt,
wherein the first media items, the second media items, and the third media items are multimedia items.

9. The media of claim 8, wherein the intent of the target user is inferred based at least in part on a perspective of a hypothetical user that is based at least in part on one or more users of the social network.

10. The media of claim 9, wherein the hypothetical user is based at least in part on:
each of the users of the social network;
one or more subsets of the users of the social network; or
the target user.

11. The media of claim 8, wherein the software is further operable when executed to generate the first prompt based at least in part on one or more templates, wherein each of the templates is associated with a prompt type.

12. The media of claim 8, wherein the software is further operable when executed to:
infer a future intent of the target user to post to the social networking system based on one or more the third media items.

13. The media of claim 8, wherein the software is further operable when executed to:
assemble one or more fourth media items relevant to the one or more third media items from which a future intent of the target user to post was inferred, wherein the assembling is based at least in part on one or more of the received indications.

14. The media of claim 12, wherein one or more of the reactions comprises:
one or more interactions by the target user with the first prompt;
no interactions by the target user with the first prompt;
a period of time with which the target user interacted with the first prompt;
one or more additions to, removals from, or edits to one or more of the assembled second media items; or
one or more assignments to, removals from, or changes to one or more privacy settings associated with one or more of the assembled second media items.

15. A system comprising:
one or more processors; and
a memory coupled to the processors comprising instructions executable by the processors, the processors being operable when executing the instructions to:
access a social-networking system to retrieve one or more first media items associated with a target user, the one or more first media items also associated with an entity of a social graph having a coefficient measurement determined based on a relationship between the entity and the target user that is greater than a threshold coefficient measurement;

infer an intent of the target user to post to the social-networking system based on one or more of the retrieved first media items and at least one of social graph information, location information, user profile information, temporal information, and privacy information associated with the target user;

assemble one or more second media items relevant to the entity of the social graph having the coefficient measurement greater than the threshold coefficient measurement and at least one of the social graph information, the location information, the user profile information, the temporal information, and the privacy information from which the intent to post was inferred;

send to the target user a first prompt to post comprising one or more of the assembled second media items; and receive one or more indications of one or more reactions of the target user to one or more of the assembled second media items in the first prompt; and send to the target user a second prompt to post one or more third media items selected based on the one or more reactions of the target user to the first prompt, wherein the first media items, the second media items, and the third media items are multimedia items.

16. The system of claim 15, wherein the intent of the target user is inferred based at least in part on a perspective of a hypothetical user that is based at least in part on one or more users of the social network.

17. The system of claim 16, wherein the hypothetical user is based at least in part on:
    each of the users of the social network;
    one or more subsets of the users of the social network; or
    the target user.

18. The system of claim 15, wherein the processors are further operable when executing the instructions to generate the first prompt based at least in part on one or more templates, wherein each of the templates is associated with a prompt type.

19. The system of claim 15, wherein the processors are further operable when executing the instructions to:
    infer a future intent of the target user to post to the social networking system based on one or more the third media items.

20. The system of claim 15, wherein the processors are further operable when executing the instructions to:
    assemble one or more fourth media items relevant to the one or more third media items from which a future intent of the target user to post was inferred, wherein the assembling is based at least in part on one or more of the received indications.

* * * * *